United States Patent
Lee et al.

(10) Patent No.: US 7,850,761 B2
(45) Date of Patent: Dec. 14, 2010

(54) METHOD AND APPARATUS FOR HIGHLY PURIFYING NITRIC OXIDE FOR SEMICONDUCTOR

(75) Inventors: Jun-Youl Lee, Seoul (KR); Bong-Soo Seo, Chungjoo (KR)

(73) Assignee: Wonikmurtrealize Co., Ltd., Chungbuk (KR)

( * ) Notice: Subject to any disclaimer, the term of this patent is extended or adjusted under 35 U.S.C. 154(b) by 747 days.

(21) Appl. No.: 11/726,921

(22) Filed: Mar. 23, 2007

(65) Prior Publication Data

US 2008/0145295 A1    Jun. 19, 2008

(30) Foreign Application Priority Data

Dec. 15, 2006   (KR) .................. 10-2006-0128467

(51) Int. Cl.
    *B01D 53/14*      (2006.01)
(52) U.S. Cl. .............. 95/92; 95/149; 95/228; 95/229; 95/232; 95/129; 95/158; 95/227; 96/126; 96/134; 96/242; 96/266
(58) Field of Classification Search .......... 95/149, 95/92, 228, 229, 232, 129, 227, 158; 96/125, 96/134, 242, 266
    See application file for complete search history.

(56) References Cited

U.S. PATENT DOCUMENTS 2,815,277 A * 12/1957 Bruggeman et al. ........... 75/408
3,891,410 A * 6/1975 Hankison ..................... 95/14
5,670,125 A * 9/1997 Sheu et al. ................ 423/239.2
6,370,911 B1   4/2002 Zhou et al.
6,387,161 B1 * 5/2002 Zhou et al. ..................... 95/119
2004/0248006 A1 * 12/2004 Tsutsumi et al. ............ 429/223

FOREIGN PATENT DOCUMENTS

WO   WO 2007/068251 A1   6/2007
WO   WO 2008/076136 A1   6/2008

* cited by examiner

*Primary Examiner*—Duane Smith
*Assistant Examiner*—Tiffany N Palmer
(74) *Attorney, Agent, or Firm*—Jenkins, Wilson, Taylor & Hunt, P.A.

(57) ABSTRACT

There is provided an apparatus for highly purifying nitric oxide by removing impurities included in nitric oxide, which comprises: a number of dehumidifiers connected to one another in a series, to remove water and carbon dioxide from the nitric oxide; a vaporizing and liquefying unit for respectively separating impurities into a gaseous state and a liquid state by cooling the nitric oxide which passed through the dehumidifiers at sub-zero temperatures; a storage tank for storing highly purified nitric oxide separated by the vaporizing and liquefying unit; an exhaust pump for discharging gaseous impurities, separated by the vaporizing and liquefying unit, to a scrubber; an outlet for discharging liquid impurities, separated by the vaporizing and liquefying unit, to the scrubber; and the scrubber 50 for purifying the gaseous and liquid impurities.

2 Claims, 3 Drawing Sheets

METHOD AND APPARATUS FOR HIGHLY PURIFYING NITRIC OXIDE FOR SEMICONDUCTOR

CROSS-REFERENCE TO RELATED PATENT APPLICATION

This application claims the benefit of Korean Patent Application No. 10-2006-0128467, filed on Dec. 15, 2006, in the Korean Intellectual Property Office, the disclosure of which is incorporated herein in its entirety by reference.

BACKGROUND OF THE INVENTION

1. Field of the Invention

The present invention relates to a method and an apparatus for highly purifying nitric oxide for semiconductor, and more particularly, to an apparatus for highly purifying nitric oxide by removing impurities included in nitric oxide, which comprises a number of dehumidifiers connected to one another in a series, to remove water and carbon dioxide from the nitric oxide; a vaporizing and liquefying unit for respectively separating impurities into a gaseous state and a liquid state by cooling the nitric oxide which passes through the dehumidifiers at sub-zero temperatures; a storage tank for storing highly purified nitric oxide separated by the vaporizing and liquefying unit; an exhaust pump for discharging gaseous impurities, separated by the vaporizing and liquefying unit, to a scrubber; an outlet for discharging liquid impurities, separated by the vaporizing and liquefying unit, to a scrubber; and a scrubber for purifying the gaseous and liquid impurities.

2. Description of the Related Art

Generally, nitric oxide is a colorless gas with the chemical formula NO, the melting point of $-163.7°$ C. and the boiling point of $-151.8°$ C. Nitric oxide does not liquefy easily and is a little heavier than air. When nitric oxide reacts with the oxygen in air, it forms nitrogen dioxide which has reddish-brown color, wherein the nitric oxide is slightly soluble in water.

Nitric oxide is generated by directly reacting nitrogen with oxygen at high temperatures or reacting a piece of copper with weak nitric acid. Nitric oxide easily reacts with various substances and is likely to be oxidized.

In a semiconductor fabrication process, nitric oxide is used when depositing an oxide layer. However, a small amount of impurities included in the nitric oxide may result in an inferior semiconductor wafer or obstruct the proper deposition.

SUMMARY OF THE INVENTION

The present invention provides an apparatus for highly purifying nitric oxide for semiconductor, which comprises a number of dehumidifiers connected to one another in a series, to remove water and carbon dioxide from the nitric oxide; a vaporizing and liquefying unit for respectively separating impurities into a gaseous state and a liquid state by cooling the nitric oxide which passes through the dehumidifiers at sub-zero temperatures; a storage tank for storing highly purified nitric oxide separated by the vaporizing and liquefying unit; an exhaust pump for discharging gaseous impurities, separated by the vaporizing and liquefying unit, to a scrubber; an outlet for discharging liquid impurities, separated by the vaporizing and liquefying unit, to a scrubber; and a scrubber for purifying the gaseous and liquid impurities.

According to an aspect of the present invention, there is provided an apparatus for highly purifying nitric oxide by removing impurities included in nitric oxide, which comprises a number of dehumidifiers connected to one another in a series, to remove water and carbon dioxide from the nitric oxide; a vaporizing and liquefying unit for respectively separating impurities into a gaseous state and a liquid state by cooling the nitric oxide which passed through the dehumidifiers at sub-zero temperatures; a storage tank for storing highly purified nitric oxide separated by the vaporizing and liquefying unit; an exhaust pump for discharging gaseous impurities, separated by the vaporizing and liquefying unit, to a scrubber; an outlet for discharging liquid impurities, separated by the vaporizing and liquefying unit, to a scrubber; and a scrubber for purifying the gaseous and liquid impurities.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which a preferred embodiment of the invention is shown.

Figure 1:
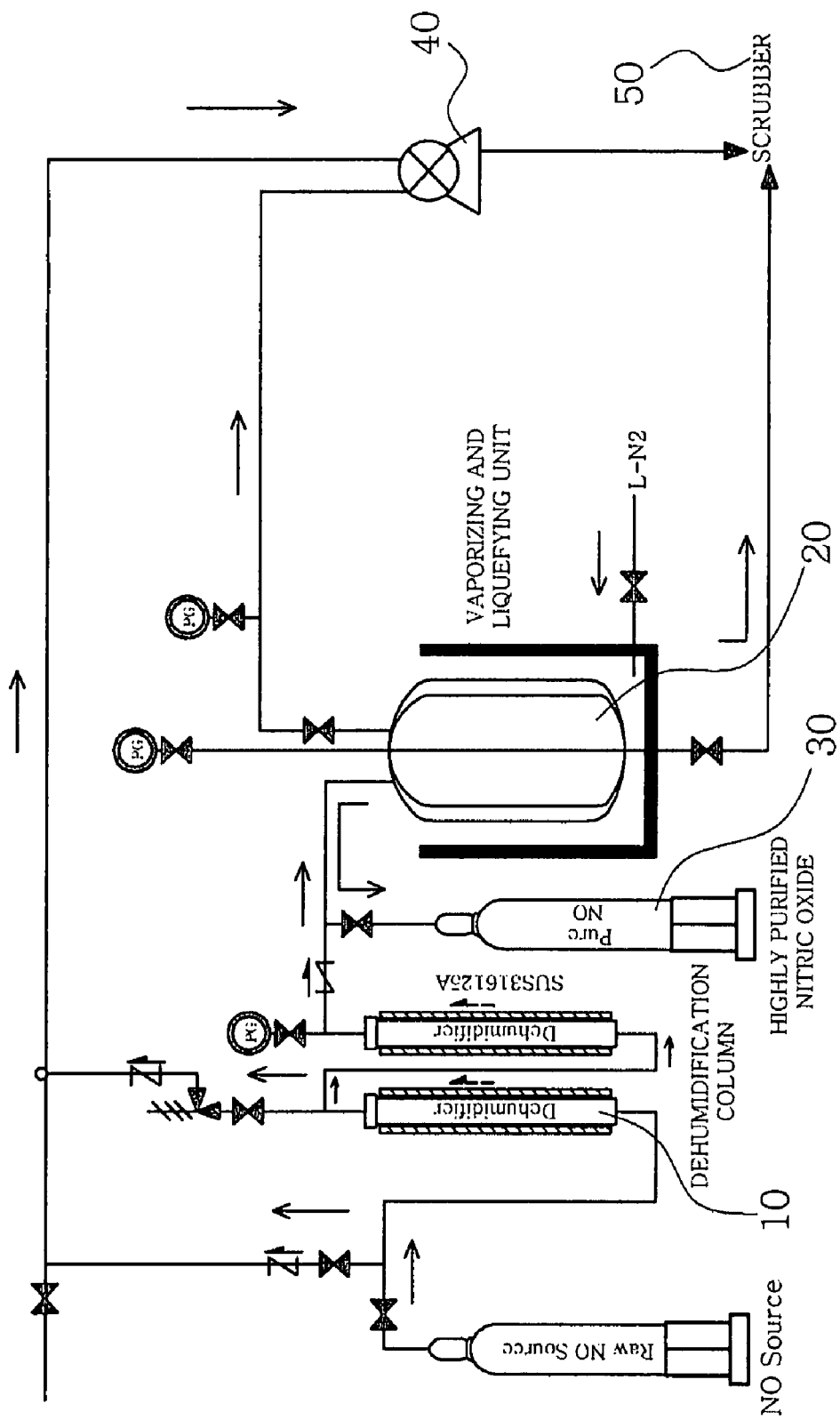
FIG. 1 is a whole block diagram illustrating an apparatus for highly purifying nitric oxide for semiconductor according to an embodiment of the present invention.
Figure 2:
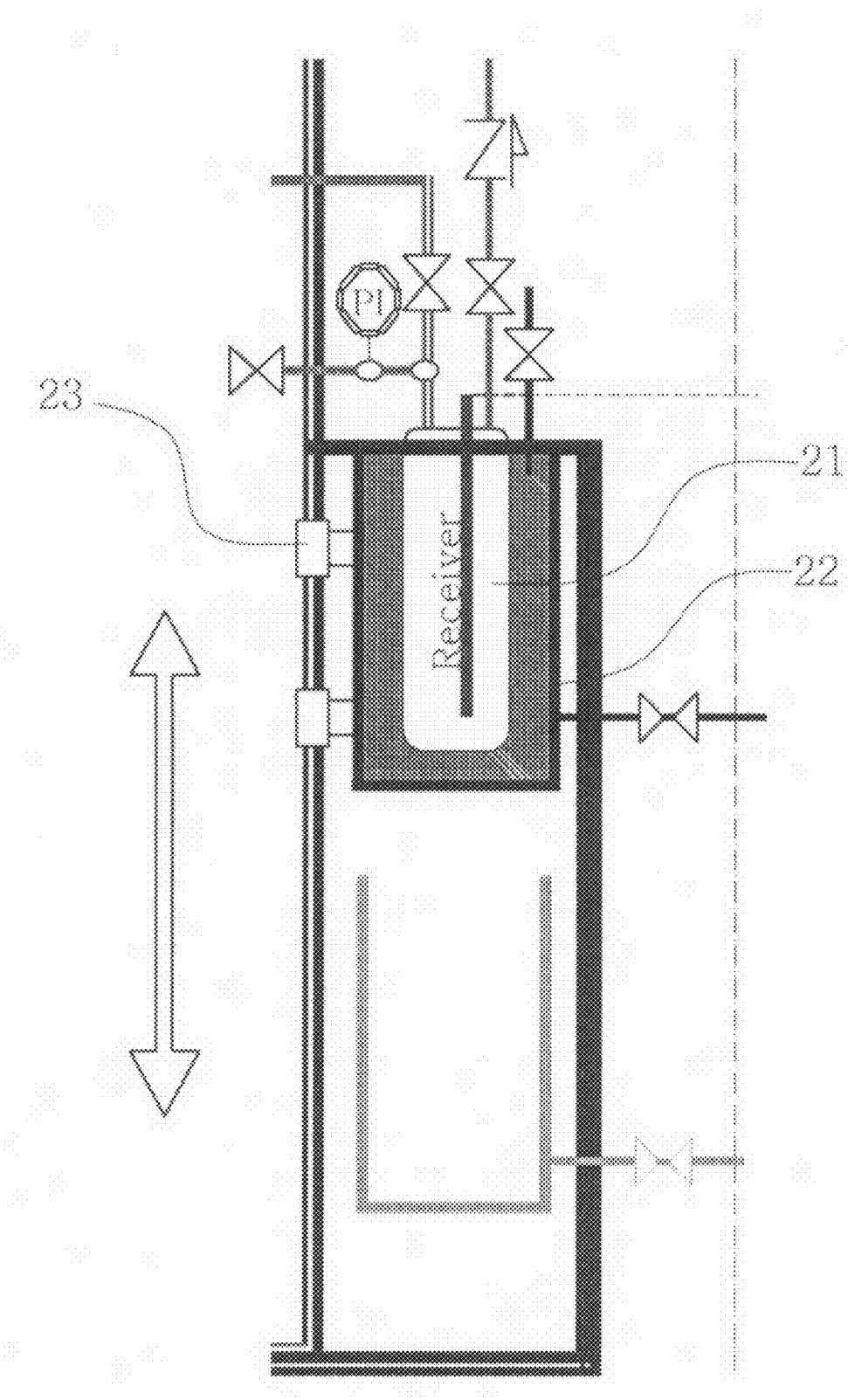
FIG. 2 is a block diagram illustrating a vaporizing and liquefying unit of the apparatus for highly purifying nitric oxide for semiconductor according to the embodiment of the present invention.
Figure 3:
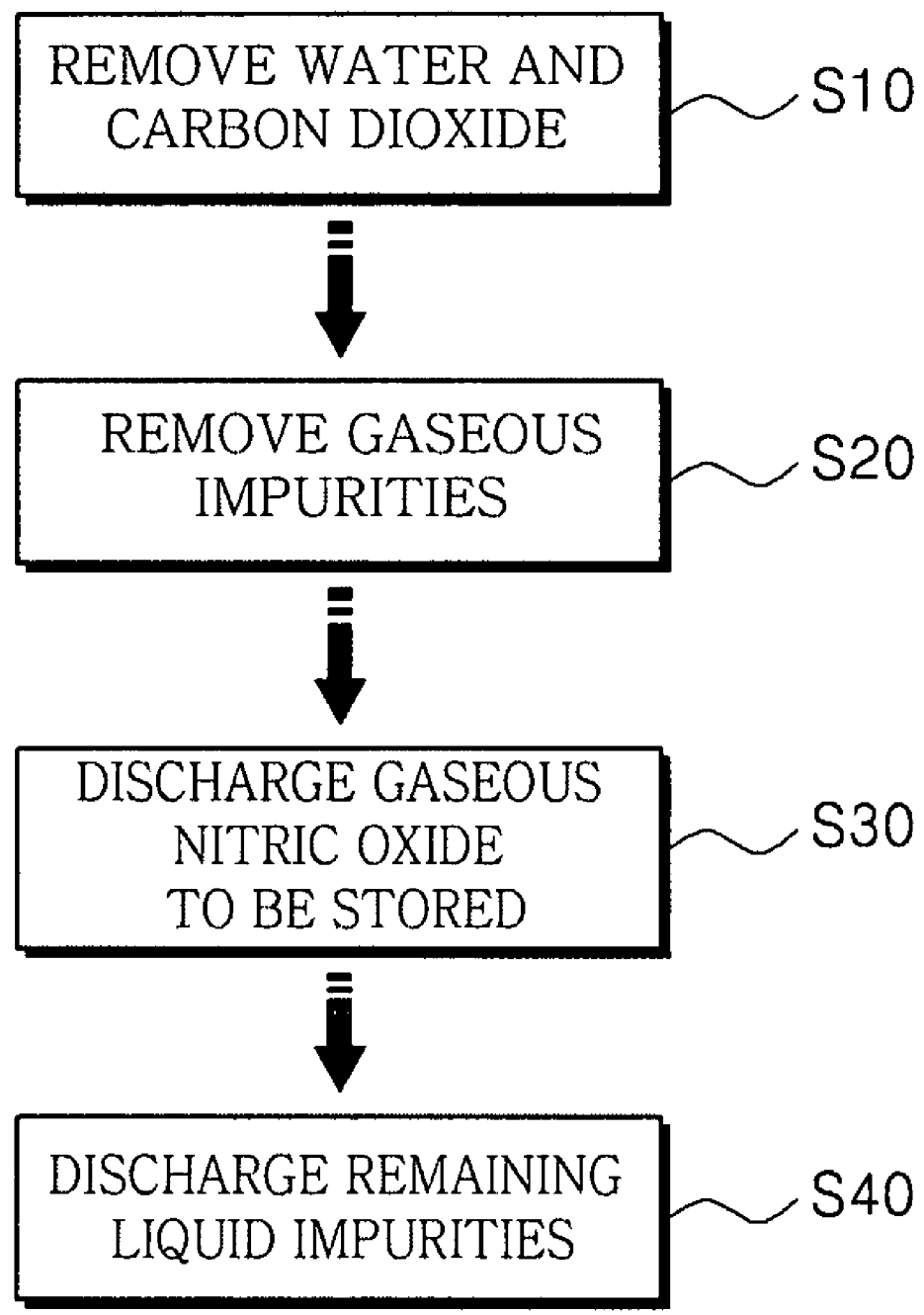
FIG. 3 is a flow chart illustrating a method highly purifying nitric oxide for semiconductor according to another embodiment of the present invention.

FIG. 1 is a whole block diagram illustrating an apparatus for highly purifying nitric oxide for semiconductor according to an embodiment of the present invention, FIG. 2 is a block diagram illustrating a vaporizing and liquefying unit of the apparatus for highly purifying nitric oxide for semiconductor, and FIG. 3 is a flow chart illustrating a method for highly purifying nitric oxide for semiconductor.

In accordance with the present invention, the apparatus for highly purifying nitric oxide by removing impurities included in nitric oxide comprises: a number of dehumidifiers 10 connected to one another in a series, to remove water and carbon dioxide from the nitric oxide; a vaporizing and liquefying unit 20 for respectively separating impurities into a gaseous state and a liquid state by cooling the nitric oxide which passes through the dehumidifiers 10 at sub-zero temperatures; a storage tank 30 for storing highly purified nitric oxide separated by the vaporizing and liquefying unit 20; an exhaust pump 40 for discharging gaseous impurities, separated by the vaporizing and liquefying unit 20, to a scrubber 50; an outlet for discharging liquid impurities, separated by the vaporizing and liquefying unit 20, to the scrubber 50; and the scrubber 50 for purifying the gaseous and liquid impurities.

The vaporizing and liquefying unit 20 comprises: a separating case 21 for separating impurities from nitric oxide; a temperature controlling case 22 surrounding around the outside of the separating case 21, the temperature controlling case 22 to which a gas for automatically controlling a temperature of the separating case 21 is injected; and a lifting unit 23 for moving the temperature controlling case 22 vertically.

The method for highly purifying nitric oxide by removing impurities included in nitric oxide comprises: a water and carbon dioxide removing step (S10); a first discharging step (S20); a nitric oxide storing step S30; and a second discharging step (S40). In the step 10, water and carbon dioxide are removed from nitric oxide which is supplied from a tank storing nitric oxide and passes through the dehumidifiers 10 with multi-stage. In the step 20, when a temperature of the vaporizing and liquefying unit 20, which stores the nitric oxide passing through the dehumidifiers 10, is maintained at −160° C., impurities are converted into a gaseous state at a high boiling point and the gaseous impurities are discharged to the scrubber 50 through the exhaust pump 40. In the step 30, when the temperature of the vaporizing and liquefying unit 20 is maintained at −70° C. or below and the temperature rises more than the boiling point of nitric oxide, the nitric oxide is converted into the gaseous state and highly purified nitric oxide is discharged to and stored in the storage tank 30. In the step 40, after the highly purified nitric oxide is discharged from the vaporizing and liquefying unit 20, the remaining impurities are in a liquid state and the liquid impurities are discharged to the scrubber 50 through the outlet.

When the liquid impurities are discharged in the second discharging step S40, helium gas is injected into the separating case 21 to form a predetermined pressure condition, so that the liquid impurities are discharged through the outlet.

The present invention will be described, in more detail, with reference to an embodiment.

General nitric oxide includes a small amount of impurities. To remove the impurities to be refined as highly purified nitric oxide of 99.95% or more, the nitric oxide needs to pass through the multi-stage dehumidifiers 10 connected to one another in a series, so that water and carbon dioxide are removed from the nitric oxide. Then, the nitric oxide from which water and carbon dioxide are removed are maintained in the vaporizing and liquefying unit 20, and the temperature of the vaporizing and liquefying unit 20 falls to −160° C.

As a result, substances with the boiling point of −160° C. or above are liquefied, and substances with the boiling point of −160° C. or below remain in the gaseous state. Among these substances, the gaseous substances are discharged to the scrubber 50 through the exhaust pump 40.

When the temperature of the vaporizing and liquefying unit 20 rises to −70° C. or below, substances with the boiling point of −70° C. or above remain at the bottom of the vaporizing and liquefying unit 20 in the liquid state, and only nitric oxide with the boiling point of −70° C. or below remains in the gaseous state and is discharged to be stored in the storage tank 30.

The nitric oxide stored in the storage tank 30 has the high purity of 99.5% or more, including nearly no impurities.

To control the pressure inside the vaporizing and liquefying unit 20, the separating case 21 and the temperature controlling case 22 surrounding the outside of the separating case 21 are controllably moved vertically simultaneously. Further, nitrogen gas is injected into the temperature controlling case 22, to control the temperature of the vaporizing and liquefying unit 20.

After the highly purified nitric oxide is discharged from the vaporizing and liquefying unit 20, to discharge the liquid substances remaining at the bottom of the vaporizing and liquefying unit 20, the helium gas is injected into the separating case 21 to rise the pressure, so that the liquid substance is discharged to the scrubber 50 through the outlet.

Then, a remaining amount of the liquid impurities in the vaporizing and liquefying unit 20 is 30 to 40 Psi.

As described above, in accordance with the present invention, the apparatus for highly purifying nitric oxide for semiconductor by removing the impurities included in nitric oxide comprises: a number of the dehumidifiers connected to one another in a series, to remove water and carbon dioxide from the nitric oxide; the vaporizing and liquefying unit for respectively separating impurities into a gaseous state and a liquid state by cooling the nitric oxide which passes through the dehumidifiers at sub-zero temperatures; the storage tank for storing highly purified nitric oxide separated by the vaporizing and liquefying unit; the exhaust pump for discharging gaseous impurities, separated by the vaporizing and liquefying unit, to a scrubber; the outlet for discharging liquid impurities, separated by the vaporizing and liquefying unit, to the scrubber; and the scrubber for purifying the gaseous and liquid impurities, thereby reducing a failure rate of wafers caused by the impurities upon the semiconductor fabrication process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for highly purifying nitric oxide by removing impurities included in nitric oxide, comprising:
   a number of dehumidifiers connected to one another in a series, to remove water and carbon dioxide from the nitric oxide;
   a vaporizing and liquefying unit for respectively separating impurities into a gaseous state and a liquid state by cooling the nitric oxide which passes through the dehumidifiers at sub-zero temperatures, wherein the vaporizing and liquefying unit comprises:
      a separating case for separating impurities included in the nitric oxide;
      a temperature controlling case surrounding the outside of the separating case, the temperature controlling case for receiving a gas for automatically controlling a temperature of the separating case; and
      a lifting unit for moving the temperature controlling case vertically whereby movement of the temperature controlling case by the lifting unit controls pressure of the vaporizing and liquefying unit;
   a storage tank for storing highly purified nitric oxide separated by the vaporizing and liquefying unit;
   an exhaust pump for discharging gaseous impurities to a scrubber for purifying the gaseous and liquid impurities; and
   an outlet for discharging liquid impurities to the scrubber.

2. A method for highly purifying nitric oxide by removing impurities included in nitric oxide, comprising:
   passing nitric oxide containing impurities through a plurality of dehumidifiers connected in a series, for removing water and carbon dioxide from the nitric oxide;
   separating the impurities into a gaseous state and a liquid state in a vaporizing and liquefying unit by cooling the nitric oxide which passes through the dehumidifiers at sub-zero temperatures wherein the vaporizing and liquefying unit comprises a separating case, a temperature controlling case surrounding the outside of the separating case, and a lifting unit;
   discharging gaseous impurities converted in the vaporizing and liquefying unit through an exhaust pump to a scrubber for purifying the gaseous impurities;
   discharging highly purified nitric oxide in a gaseous state from the vaporizing and liquefying unit to a storage tank; and
   discharging liquid impurities remaining in the vaporizing and liquefying unit through an outlet to the scrubber.

* * * * *